United States Patent Office

Re. 27,619
Reissued Apr. 17, 1973

27,619

AMMONIUM NITRATE-ALKALI METAL NITRATE EXPLOSIVE CONTAINING ALUMINUM OF PARTICULAR SIZE DISTRIBUTION

Charles H. Grant, Midland, Mich., assignor to The Dow Chemical Company, Midland, Mich.

No Drawing. Original No. 3,307,986, dated Mar. 7, 1967, Ser. No. 419,262, Oct. 16, 1964, which is a continuation-in-part of Ser. No. 299,115, July 31, 1963. Application for reissue Aug. 4, 1969, Ser. No. 860,444
Int. Cl. C06b *1/04*
U.S. Cl. 149—21 10 Claims

Matter enclosed in heavy brackets [ ] appears in the original patent but forms no part of this reissue specification; matter printed in italics indicates the additions made by reissue.

This application is a continuation-in-part of application Ser. No. 299,115, filed July 31, 1963, now abandoned.

This invention relates to explosives and more particularly is concerned with a novel water resistant, metallized high energy explosive composition.

The novel explosive composition of the present invention comprises (on a weight basis);

(a) Alkali metal nitrate to about 60%, (d) Ammonium nitrate from about 10 to about 85%, (c) Particulate aluminum from about 5 to about 40%, (d) Water from about 5 to about 25%, and (e) A gelling or thickening agent from about 0.2 to about 1.5%.

In a preferred embodiment, the present novel composition comprises on a weight basis;

(a) Sodium nitrate from about 5 to about 40%, (b) Ammonium nitrate from about 15 to about 80%, (c) Particulate aluminum from about 10 to about 30%, (d) Water from about 6 to about 16%, (e) Liquid, organic water-miscible liquid extender from about 2 to about 16%, and (f) A water-swellable, hydrophobic, cross-linkable gum and cross-linking agent therefor from about 0.5 to about 1.5%.

The particulate aluminum to be employed in the present composition ranges from about 4 to about 150 mesh U.S. Standard Sieve and has a gauge (thickness) of from about 0.025 to about 30 mils. The metal is further characterized in having a particle size distribution wherein from about 60 to about 80 percent of the aluminum is from about 12 to 50 mesh the balance being substantially 50 to 100 mesh and wherein from about 5 to 10% of the particles have a gauge of up to 1 mil, from about 70 to about 80% have a gauge of from 1 to about 10 mils and the balance are substantially from 10 to about 30 mils in gauge.

Ordinarily, the aluminum metal employed has a particle size and gauge distribution as set forth in Table I.

TABLE I

| | Distribution, percent |
|---|---|
| Metal particle size (U.S. Standard Sieve), mesh: | |
| 30–50 | 60–70 |
| 50–100 | 25–35 |
| 100–150 | about 5 |
| Metal gauge: | |
| Up to 1 mil | 6–8 |
| 1 to 5 mil | 14–17 |
| 5–10 mil | 73–77 |
| 10–15 | 3–7 |
| >15 mil | <.1 |

Preferably the metal ranges from about 0.025 to about 5 mils in gauge.

The term "aluminum" as used herein is meant to include both aluminum and aluminum alloys containing at least about 60% by weight aluminum.

Liquid organic fluid extenders which ordinarily are employed are those having a favorable carbon-oxygen ratio such that there is no detrimental competition of the carbon with the metal for available oxygen in the system. Monohydroxy alkanols containing from 1 to about 4 carbon atoms, ethylene glycol, propylene glycol, glycerol, formamide and mixtures thereof are particularly suitable. Preferably, the carbon-oxygen balanced compounds, e.g., methanol, ethylene glycol, glycerol and formamide are used as extenders of diluents in the present composition. Ordinarily, formamide, which has a low carbon content and relatively high boiling point is utilized as the liquid extender.

Any of a variety of water-resistant natural gums and synthetic gelling or thickening agents can be employed. Particularly suitable gums for use in the present composition are the guar gums or mixtures of guar and karaya gums. These materials not only provide the water insolubility desired in the product but also readily are crosslinked to any predetermined degree thereby providing the necessary flow and nonrigid characteristics to the product. Any of a variety of conventional crosslinking agents can be employed to achieve the crosslinking of the gum. The amount of crosslinking agent used is such that the resulting water resistant explosive is pliable and gelatinous. To illustrate, with a guar gum, about 2.5 weight percent (based on gum weight) of a 5 percent sodium dichromate solution has been found to be a satisfactory agent for preparing the present composition. Likewise, a saturated solution of ammonium nitrate in liquid ammonia (Diver's liquid) can be used. Conveniently to aid dispersion of this latter crosslinking material throughout the mix it can be diluted up to about 50 percent or more by volume with water.

Because of the nature of the present composition, a portion of the ammonium nitrate is in solution in the aqueous medium. Ordinarily, however, from about 5 to about 40 percent and preferably from about 12 to about 35 percent of the total weight of ammonium nitrate is present as a solid, particulate grained material passing a 20 mesh U.S. Standard Sieve. While [these] *the* present invention requires the presence of ammonium nitrate as the oxidizer, at least a part of the ammonium nitrate may be replaced by sodium-lithium-potassium or other alkali metal nitrate, if desire, to obtain increased or decreased density, sensitivity or other properties.

The ammonium nitrate solution can be added directly as such in preparation of the explosive composition. Preferably, however, a predetermined amount of water within the disclosed range of from about 5 to about 25 weight percent of the total composition weight is added to a mixture of the liquid organic fluid extender suspersaturated with ammonium nitrate and gelling or thickening agent. The water temperature is maintained to provide a maximum temperature of the thickener-ammonium nitrate containing liquid organic-water mixture of about 140° F. Ordinarily in operation the mix temperature is maintained from about 0° F. to about 140° F., and preferably from about 50 to about 100° F. Solid particulate ammonium nitrate is then added to the aqueous mixture so as to provide a saturated solution of ammonium nitrate. A prime advantage of this latter procedure resides in the fact that the temperature of the mixture readily is controlled by rate of ammonium nitrate addition thereby assuring that detrimental temperature dependent phase transformations of ammonium nitrate do not occur.

The terms "mesh" or "mesh size" as applied herein to various materials means size determinations made by standard, vibratory, controlled test procedures.

The present novel product safely can be stored, shipped and handled either in the bulk state or when placed in bags or other containers. Conveniently for use in bore hole blasting operations the product can be placed in polyethylene or other easily deformable bags so as to provide preweighed units of material.

In use, the bagged materials can be directly inserted into a bore hole, or for enlarged, chambered holes, e.g., the bags can be slit or otherwise opened before placing in the hole. This latter action assures that the explosive composition will fill the bore hole volume and conform with the wall configuration of the hole.

Because of its high resistance to detrimental degradation by water and its density (1.15 to about 1.3 grams/cubic centimeter), the present novel explosive composition finds a high utility both in dry holes as well as "wet" holes which ordinarily must be treated and loaded by special techniques. In wet or water-containing holes the explosive can be simply poured therein, whereupon it displaces the water and fills the hole. Such loaded wet holes can stand for extended periods, up to several weeks or more, prior to firing without encountering any detrimental degradation of the load or decreased explosive energy.

Detonation of the explosive is accomplished by conventional boosters and primers, shaped charges and other high energy initiators. The material is insensitive to an electric blasting cap and is not initiated by a high velocity rifle bullet.

The following examples will serve to further illustrate the present invention, but are not meant to limit it thereto.

Example 1. A 1000 pound batch of the present explosive composition was prepared as follows. Sufficient ammonium nitrate was added to about 13 parts by weight formamide to provide a supersaturated solution at room temperature (i.e. about 25° C.). (Parts by weight as used in this example are based on the total batch of product.) About 1 part by weight guar gum was added thereto and the mix agitated to disperse the gum throughout the mass. This was followed by the addition of about 12 parts by weight water saturated with ammonium nitrate at about 60° F. (The aqueous ammonium nitrate solution contained from about 17.5 to about 20 parts by weight, based on total mix, ammonium nitrate.) The resulting mixture was agitated to provide a substantially homogeneous mass after which time the mixture was permitted to stand without mixing or stirring for a period of time, e.g. at least about 15 minutes, to assure that the gum swelled to a predetermined state. After this period, about 10 parts by weight sodium nitrate, about 20 parts by weight of particulated aluminum and from about 20 to about 25 parts by weight of the fine grain ammonium nitrate successively were blended into the mix. The aluminum was about 80 percent 12–50 mesh, balance substantially 50 to 100 mesh (U.S. Standard Sieve) wherein from about 5 to about 10 percent of the particles had a maximum gauge of about 1 mil, about 75 percent were from 1 to about 10 mils, the balance being substantially 10 to about 30 mils in gauge. About 400 cubic centimeters of a mixture of 200 cubic centimeters Diver's liquid diluted with about an equal volume of water was blended into the final composition to cross-link the gum.

The resulting composition was highly viscous but flowable and had a density of about 1.2 grams per cubic centimeter.

The water resistance of the final product was determined by the following standardized test.

A weighed sample was submerged in a water bath maintained at a temperature of about 50° F. and having a large excess of water per sample weight. The water was continuously agitated by high speed stirrers positioned above the samples for a three hour period. After this time, the samples were removed from the bath, examined for physical appearances of deterioration and weighed. Tests run on multiple samples showed no visible effect of water attack after the lengthy, rigorous test. These samples indicated substantially no weight losses from this test.

About 30 pounds of the material were placed in a 4-inch diameter cylindrical cardboard tube and subjected to a standard high velocity rifle bullet test. No initiation occurred.

Explosive tests were run both underwater and in granite. Comparative shots of prilled ammonium nitrate-5 percent fuel oil were used as a control.

For the underwater shots, a standard test was employed wherein an explosive charge is detonated in a body of water at about half the depth of the lake or pond (30 feet in the present case) and the resulting pressure profile converted into electric impulses by one or more piezoelectric gauges suspended in the water at the same level a known horizontal distance away from the charge. The impulses are recorded on an oscilloscope and photographed. Peak pressure, shock energy, bubble energy, after burn energy and total energy of the explosive readily are calculated by the methods described in "Underwater Explosives," R. H. Cole, Princeton University Press (1948), from the observed impulses.

Table II summarizes the results of underwater test shots of the present explosive composition and the ammonium nitrate-fuel oil control.

TABLE II

| Run No. | Composition | Peak pressure, lb./sq. in. | Shock energy, Kcal./gm. | After burn energy, Kcal./gm. | Bubble energy, Kcal./gm. | Total energy, Kcal./gm. |
|---|---|---|---|---|---|---|
| 1 | Present composition | 4,200 | 0.896 | 0.021 | 0.930 | 1.847 |
| 2 | Ammonium nitrate, 5% fuel oil (control) | 2,060 | 0.458 | 0.004 | 0.440 | 0.902 |

Crater shots carried out in granite with these same explosive compositions showed that for comparable charges the present novel composition gave a crater volume about 4.96 times that of the ammonium nitrate-fuel oil.

In a second run, a 1000 pound batch of the explosive composition was prepared by adding sufficient ammonium nitrate to about 13 parts by weight formamide to provide a supersaturated solution at room temperature. About 0.9 part by weight guar gum was added to this solution and the mix agitated to disperse the gum throughout the mass. This was followed by the addition of about 12 parts by weight water (about 100° F.). Seventeen parts by weight particulate ammonium nitrate then were added at a controlled rate to the resulting aqueous dispersion to provide a solution saturated with ammonium nitrate at about 60° F. The resulting mixture was agitated to provide a substantially homogeneous mass after which time the mixture was permitted to stand without mixing or stirring for a period of time, e.g. at least about 15 minutes, to assure that the gum swelled to a predetermined state. After this period, about 12 parts by weight sodium nitrate, about 20 parts by weight of particulated aluminum and from about 22.3 parts by weight of the fine grain ammonium nitrate successively were blended into the mix. The aluminum was about 80 percent 12–50 mesh, balance substantially 50 to 100 mesh (U.S. Standard Sieve) wherein from about 5 to about 10 percent of the particles had a maximum gauge of about 1 mil, about 75 percent were from 1 to about 10 mils, the balance being substantially 10 to about 30 mils in gauge. About 400 cubic centimeters of a mixture of 200 cubic centimeters Diver's liquid diluted with about an equal volume of water was blended into the final composition to cross-link the gum.

The resulting composition was highly viscous but flowable and had a density of about 1.2 grams per cubic centimeter.

This composition exhibited substantially the same desirable water resistance and excellent detonation characteristics as the explosive prepared in the preceding run.

Example 2.—A number of explosives were prepared in the same manner and using the same constituents as set forth in Example 1 except that various other organic liquid extenders were substituted for the formamide. Table III tabulates these compositions.

TABLE III

| | Percent by weight | | | |
|---|---|---|---|---|
| | I | II | III | IV |
| $NaNO_2$ | 0.5 | 5 | 20 | 10. |
| $H_2O$ | 10 | 10 | 10 | 12. |
| Organic liq | Methanol-5 | Propylene glycol-5. | Glycerol-5 | Formamide-6, ethylene glycol-6. |
| Aluminum | 20 | 20 | 15 | 20. |
| Gum | 0.5 | 1 | 1.5 | 1.3. |
| Ammonium nitrate | 64 | 59 | 48.5 | 44.7. |

All of the products exhibited substantially complete water resistance, were flowable, ranged from about 1.15 to about 1.3 grams per cubic centimeter in density, and had explosive energies about the same as that shown for the composition of Example 1.

Example 3.—A composition was prepared in accordance with the procedure described and using the components set forth in Example 1. However for this product the aluminum content was increased to 25 weight percent of the total and the solid ammonium nitrate reduced accordingly. The particulate aluminum employed was a mixture of (1) about 70% of a material ranging from about 60–70% of 30–50 mesh, about 25–35% of 50–100 mesh and about 5% minus 100 mesh U.S. Standard Sieve and having a gauge of from about 6–8% up to 1 mil, about 14–17% from 1 to 5 mil, about 73–77% from 5 to 10 mil, balance substantially 10 to 15 mil and (2) about 30% of a flake material having a thickness of from about 0.1 to about 4 mils and ranging in size from about 4 to about 100 mesh U.S. Standard Sieve.

This product exhibited excellent water resistance, was viscous but flowable and did not detonate when subjected to the standard high velocity rifle bullet test.

Underwater explosive tests and crater shots indicated this product released explosive energies about 20% greater than that provided by the product of Example 1.

In a manner similar to that described for the foregoing examples, highly useful, water resistant, flowable, high energy, explosive compositions of the present invention can be prepared having the following formulations (on a weight basis).

(1)

| | Percent |
|---|---|
| $NaNO_3$ | 8 |
| $H_2O$ | 12 |
| Formamide | 11 |
| Al (particulate) | 15 |
| Guar gum | 1 |
| $NH_4NO_3$ | 53 |

(2)

| | |
|---|---|
| $KNO_3$ | 8 |
| $H_2O$ | 12 |
| Propanol | 11 |
| Al (particulate) | 25 |
| Gum | 1 |
| $NH_4NO_3$ | 43 |

(3)

| | Percent |
|---|---|
| $NaNO_3$ | 25 |
| $H_2O$ | 12 |
| Methanol | 11 |
| Al (particulate) | 25 |
| Gum | 1.5 |
| $NH_4NO_3$ | 25.5 |

(4)

| | |
|---|---|
| $NaNO_3$ | 36 |
| $H_2O$ | 12 |
| Formamide | 11 |
| Al (particulate) | 20 |
| Gum | 1 |
| $NH_4NO_3$ | 20 |

(5)

| | |
|---|---|
| $NaNO_3$ | 0.5 |
| $H_2O$ | 14 |
| Butanol | 6 |
| Al (particulate) | 5 |
| Gum | 0.5 |
| $NH_4NO_3$ | 74 |

(6)

| | |
|---|---|
| $KNO_3$ | 50 |
| $H_2O$ | 5 |
| Formamide | 15 |
| Al (particulate) | 19 |
| Gum | 1 |
| $NH_4NO_3$ | 10 |

(7)

| | |
|---|---|
| $NaNO_3$ | 0.5 |
| $H_2O$ | 12.5 |
| Formamide | 1 |
| Al (particulate) | 5 |
| Gum | 1 |
| $NH_4NO_3$ | 80 |

Various modifications can be made in the present invention without departing from the spirit or scope thereof for it is understood that I limit myself only as defined in the appended claims.

I claim:

1. A water resistant metallized, flowable explosive composition which comprises on a weight basis;

(a) to about 60 percent alkali metal nitrate, (b) from about 10 to about 85 percent ammonium nitrate, (c) from about 5 to about 25 percent water, (d) from about 0.2 to about 1.5 percent of a member selected from the group consisting of water swellable gelling and thickening agents, and (e) from about 5 to about 40 percent particulate aluminum, said aluminum ranging in size from about 4 to about 150 mesh U.S. Standard Sieve and having a gauge of from about 0.025 to about 30 mils and being further characterized in having a particle size distribution wherein from about 60 to about 80 percent is from about 12 to about 50 mesh the balance being substantially 50 to 100 mesh and wherein from about 5 to about 10 percent of the particles have a maximum gauge of about 1 mil, from about [10] *70* to about 80 percent have a gauge of from 1 to about 10 mils, balance ranging from 10 to about 30 mils in gauge.

2. A water resistant, high energy, metallized, flowable explosive composition which comprises on a weight basis;

(a) from about 5 to about 40 percent sodium nitrate,
(b) from about 15 to about 80 percent ammonium nitrate,
(c) from about 6 to about 16 percent water,
(d) from about 2 to about 16 percent of a liquid, organic water-miscible liquid extender,
(e) from about 0.5 to about 1.5 percent of a water-swellable, hydrophobic, cross-linkable gum and cross-linking agent therefor, and
(f) from about 10 to about 30 percent particulate aluminum, said aluminum having (1) a particle size of from about 30 to about 100 mesh wherein the particle size distribution ranges from about 60 to about 70 percent of about 30 to about 50 mesh, from about 25 to about 35 percent of from about 50 to about 100 mesh, balance from about 100 to about 150 mesh and (2) a gauge of from about 1 to about 15 mils and distribution such that about 6 to about 9 percent of the particles have a maximum thickness of about 1 mil, from about 14 to about 17 percent range from about 1 to about 15 mils, from about 73 to about 77 percent range from about 5 to about 10 mils, balance substantially from 10 to about 15 mils.

3. The composition as defined in claim 2 wherein the water miscible organic liquid is a member selected from the group consisting essentially of monohydroxy alkanols containing from 1 to about 4 carbon atoms, ethylene glycol, propylene glycol, glycerol, formamide and mixtures thereof.

4. A water resistant, metallized, high energy, flowable explosive composition which comprises on a weight basis:

(a) about 10 percent sodium nitrate
(b) from about 37.5 to about 45 percent ammonium nitrate
(c) about 12 percent water
(d) about 13 percent formamide
(e) about 1 percent of guar gum and a crosslinking agent therefor, and
(f) from about 19 to about 26.5 percent particulate aluminum, said aluminum having (1) a particle size of from about 30 to about 100 mesh wherein the particle size distribution ranges from about 60 to about 70 percent of about 30 to about 50 mesh, from about 25 to about 35 percent of from about 50 to about 100 mesh, balance from about 100 to about 150 mesh and (2) a gauge of from about 1 to about 15 mils and distribution such that about 6 to about 9 percent of the particles have a maximum thickness of about 1 mil, from about 14 to about 17 percent range from about 1 to about 5 mils, from about 73 to about 77 percent range from about 5 to about 10 mils, balance substantially from 10 to about 15 mils.

5. A water resistant, metallized, high energy, flowable explosive composition which comprises on a weight basis:

(a) about 10 percent sodium nitrate,
(b) from about 39 to about 44 percent ammonium nitrate,
(c) about 12 percent water
(d) about 13 percent formamide
(e) about 1 percent of guar gum and a crosslinking agent therefor, and
(f) from about 20 to about 25 percent particulate aluminum, said aluminum being a mixture of about 70% of a material ranging from about 60–70% of 30–50 mesh, about 25–35% of 50–100 mesh and about 5% minus 100 mesh U.S. Standard Sieve and having a gauge of from about 6–8% up to 1 mil, about 14–17% from 1 to 5 mil, about 73–77% from 5 to 10 mil, balance substantially 10 to 15 mil and about 30% of a flake material having a thickness of from about 0.1 to about 4 mils and ranging in size from about 4 to about 100 mesh U.S. Standard Sieve.

6. A process for preparing a water resistant, metallized high energy explosive which comprises:

(a) adding from about 0.5 to about 1.5 parts by weight of a cross-linkable, hydrophobic, water-swellable guar gum to from about 2 to about 16 parts by weight of a water miscible, organic liquid selected from the group consisting of monohydroxy alkanols having from 1 to about 4 carbon atoms, ethylene glycol, propylene glycol, glycerol, formamide and mixtures thereof, said organic liquid being supersaturated with ammonium nitrate,
(b) agitating said mix to disperse said gum throughout the mass,
(c) introducing from about 6 to about 16 parts by weight of an aqueous saturated ammonium nitrate solution therein and mixing thereby to provide a substantially homogeneous mass,
(d) stopping the mixing operation and permitting the mixture to stand for a period of time such that the gum swells to a predetermined state,
(e) successively blending into said mixture
  (1) from about 5 to about 40 parts by weight sodium nitrate,
  (2) from about 10 to about 30 parts by weight particulate aluminum, said aluminum being from about 60 to about 80 percent of 12 to about 50 mesh, balance being substantially 50 to 100 mesh in size and where from about 5 to about 10 percent of the particles have a maximum thickness of about 1 mil, from about 70 to about 80 percent range from about 1 to about 10 mils in thickness, the balance being substantially from 10 to about 30 mils, and
  (3) from about 10 to about 40 parts by weight ammonium nitrate,
(f) adding to said mass about 0.2 cubic centimeter per pound weight of total mixture of a member selected from the group consisting of aqueous sodium dichromate containing about 5% by weight of the solute and Diver's liquid as cross-linking agent for said gum, and
(g) blending said cross-linking agent into the final composition thereby to cross-link said gum to a predetermined degree and produce a water resistant, high energy, flowable metallized explosive.

7. A process for preparing a water resistant, metallized high energy explosive which comprises:

(a) dispersing about 1 part by weight of a guar gum in about 13 parts by weight formamide supersaturated with ammonium nitrate,
(b) adding thereto about 12 parts by weight water saturated with ammonium nitrate at about 60° F. and agitating the mixture to provide a substantially homogeneous mass,
(c) stopping said agitation and permitting the mass to stand for at least about 15 minutes whereupon the guar gum swells to a predetermined state,
(d) successively blending into said mixture
  (1) about 10 parts by weight sodium nitrate,
  (2) about 20 parts by weight particulated aluminum, said aluminum being about 80 percent from about 12 to about 50 mesh, balance being substantially about 50 to about 100 mesh and from about 5 to about 10 percent of the particles having a maximum gauge of about 1 mil, about 75 percent being from about 1 to about 10 mils in gauge, the balance being substantially from about 10 to about 30 mils in thickness, and
  (3) from about 20 to about 25 parts by weight ammonium nitrate
(e) adding about 0.2 cubic centimeter Diver's liquid per pound weight of the total mixture to said mass, said Diver's liquid being diluted with about an equal (f) blending the aqueous solution of said Diver's liquid into the final composition thereby to cross-link said gum to a predetermined degree and produce a water resistant, high energy, flowable, metallized explosive.

8. The process as defined in claim 6 and including the step of providing in situ the aqueous saturated ammonium nitrate solution added to the dispersion of the gum and organic liquid supersaturated with ammonium nitrate by adding from about 6 to about 16 parts by weight water to said dispersion to provide an aqueous mix having a maximum temperature of about 140° F. and introducing particulate ammonium nitrate into said aqueous mix to provide an aqueous saturated ammonium nitrate solution therein.

9. The process as defined in claim 7 and including the step of providing in situ the aqueous saturated ammonium nitrate solution added to the dispersion of the guar gum and formamide supersaturated with ammonium nitrate by adding about 12 parts by weight water to said dispersion to provide an aqueous mix having a maximum temperature of about 140° F. and introducing particulate ammonium nitrate into said aqueous mix to provide an aqueous saturated ammonium nitrate solution therein.

10. A process for preparing a water resistant, metallized high energy explosive which comprises:

(a) adding from about 0.5 to about 1.5 parts by weight of a cross-linkable, hydrophobic, water-swellable guar gum to from about 2 to about 16 parts by weight of a water miscible organic liquid selected from the group consisting of monohydroxy alkanols having from 1 to about 4 carbon atoms, ethylene glycol, propylene glycol, glycerol, formamide and mixtures thereof, said organic liquid being supersaturated with ammonium nitrate, (b) agitating said mix to disperse said gum throughout the mass, (c) introducing into said mass from about 5 to about 25 parts by weight water while the temperature of the resulting aqueous mixture is maintained at a maximum of about 140° F., (d) adding solid particulate ammonium nitrate to said aqueous mixture so as to provide a solution saturated with respect to ammonium nitrate and mixing thereby to provide a substantially homogeneous mass, (e) stopping the mixing operation and permitting the mixture to stand for a period of time such that the gum swells to a predetermined state, (f) successively blending into said mixture (1) from about 5 to about 40 parts by weight sodium nitrate, (2) from about 10 to about 30 parts by weight particulate aluminum, said aluminum being from about 60 to about 80 percent of 12 to about 50 mesh, balance being substantially 50 to 100 mesh in size and where from about 5 to about 10 percent of the particles have a maximum thickness of about 1 mil, from about 70 to about 80 percent range from about 1 to about 10 mils in thickness, the balance being substantially from 10 to about 30 mils, and (3) from about 10 to about 40 parts by weight ammonium nitrate, (g) adding to said mass about 0.2 cubic centimeter per pound weight of total mixture of a member selected from the group consisting of aqueous sodium dichromate containing about 5% by weight of the solute and Diver's liquid as cross-linking agent for said gum, and (h) blending said cross-linking agent into the final composition thereby to cross-link said gum to a predetermined degree and produce a water resistant, high energy, flowable metallized explosive.

References Cited

The following references, cited by the Examiner, are of record in the patented file of this patent or the original patent.

UNITED STATES PATENTS

| | | | |
|---|---|---|---|
| 3,083,127 | 3/1963 | Griffith et al. | 149—41 X |
| 3,094,069 | 6/1963 | Hradel et al. | 149—43 X |
| 3,094,443 | 6/1963 | Hradel et al. | 149—43 X |
| 3,121,036 | 2/1964 | Cook et al. | 149—41 X |
| 3,139,029 | 6/1964 | Bjark | 149—43 X |
| 3,153,606 | 10/1964 | Breza et al. | 149—42 X |
| 3,190,777 | 6/1965 | Breza et al. | 149—57 |
| 3,214,307 | 10/1965 | Logan et al. | 149—43 X |
| 3,236,180 | 2/1966 | Towle | 149—46 |

CARL D. QUARFORTH, Primary Examiner

S. J. LECHERT, Jr., Assistant Examiner

U.S. Cl. X.R.

149—41, 44, 60, 61, 114